(12) United States Patent
Wu et al.

(10) Patent No.: US 9,287,669 B2
(45) Date of Patent: Mar. 15, 2016

(54) SATA EXPRESS CONNECTOR

(71) Applicant: Innodisk Corporation, New Taipei (TW)

(72) Inventors: Hsi-Hsi Wu, New Taipei (TW); Cheng Chun Chang, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 0 days.

(21) Appl. No.: 14/630,912

(22) Filed: Feb. 25, 2015

(65) Prior Publication Data

US 2015/0244119 A1 Aug. 27, 2015

Related U.S. Application Data

(60) Provisional application No. 61/945,313, filed on Feb. 27, 2014.

(51) Int. Cl.
*H01R 13/648* (2006.01)
*H01R 24/62* (2011.01)
*G06F 13/38* (2006.01)

(52) U.S. Cl.
CPC .............. *H01R 24/62* (2013.01); *G06F 13/385* (2013.01)

(58) Field of Classification Search
CPC .......................... H01R 23/688; H01R 23/7073
USPC ................... 439/607.11, 607.31–607.4, 660, 439/607.13, 607.09
See application file for complete search history.

(56) References Cited

U.S. PATENT DOCUMENTS

| | | | | |
|---|---|---|---|---|
| 8,535,075 B1 * | 9/2013 | Golko | ................. | H01R 13/516 439/218 |
| 2009/0172279 A1 * | 7/2009 | Yuan | .................... | G06K 7/0008 711/115 |
| 2015/0244119 A1 * | 8/2015 | Wu | ........................ | H01R 24/62 439/638 |

* cited by examiner

*Primary Examiner* — Phuongchi T Nguyen
(74) *Attorney, Agent, or Firm* — Chun-Ming Shih (57) ABSTRACT

The present invention relates to a data connector, particularly a SATA Express connector having a power supplying line, the SATA Express connector including a device-side connector and a board-side connector, where the device-side connector is provided with at least one second device-side connector and a first device-side connector, which includes a power receiving pin, a PERST# pin, a CLKREQ#/DEVSLP pin and an IFDet pin, the board-side connector is provided with at least one second board-side connector and a first board-side connector, which is correspondingly provided with a power supplying pin, a PERST# pin, a CLKREQ#/DEVSLP pin and an IFDet pin; when the device-side connector is engaged with the board-side connector, the power supplying pin of the board-side connector provide a working power source through the device-side connector to an application component, and thus transmission of SATA or PCIe data can be carried out without additionally providing an external power cable.

13 Claims, 6 Drawing Sheets

FIG. 1

(PRIOR ART)

SATA EXPRESS CONNECTOR

CROSS-REFERENCES TO RELATED APPLICATIONS

This non-provisional application claims priority under 35 U.S.C. §119(a) on Patent Application No. 61/945,313 filed in U.S.C. on Feb. 27, 2014 as a provisional application, the entire contents of which are hereby incorporated by reference.

BACKGROUND

1. Technical Field

The present invention relates to a data connector, and particularly to a SATA Express connector having a power supplying line.

2. Related Art

During evolution of an information society, storage devices are always indispensable peripherals in a computer system, for example, a hard disk device, and a transmission interface of a hard disk has been changed from an early PATA transmission interface (Parallel Advanced Technology Attachment) into a currently mainstream SATA transmission interface (Serial Advanced Technology Attachment Interface), through the change into the SATA transmission interface, the transmission speed of data thereof will be significantly increased, and a data transmission line of the SATA is also much finer than that of the old PATA, which not only can simplify an installation procedure but also can effectively improve air circulation inside a computer mainframe, thereby increasing heat dissipation efficiency.

Figure 1:
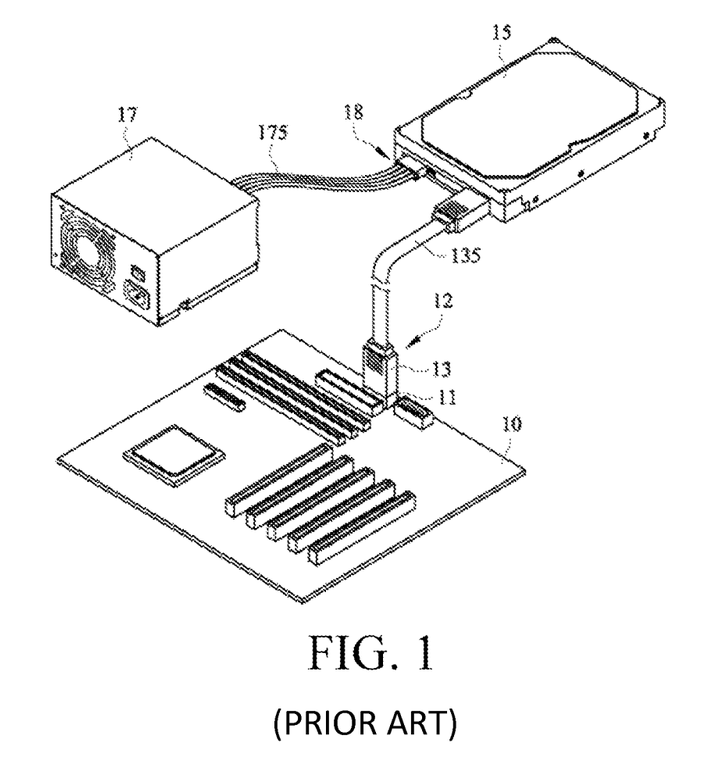
FIG. 1 is a schematic diagram of use of a conventional SATA data transmission interface.

However, referring to a schematic diagram of use of a conventional SATA transmission interface, as shown in FIG. 1, the SATA transmission interface mainly includes a SATA data connector 12 and a SATA power connector 18. The SATA data connector 12 further includes a board-side connector 11 and a device-side connector 13, where the board-side connector 11 is fixedly disposed on a circuit board, a motherboard or a computer system 10, electrically connected to other circuit board components, the device-side connector 13 is disposed on one end of a SATA data cable 135, and the other end of the SATA data cable 135 can be electrically connected to a SATA external device 15, for example, a hard disk, a DVD ROM, a memory, a control device or other application elements. As the SATA data cable 135 does not provide a working power source for the external device 15, it is necessary to connect the external device 15 and a power supply 17 through the SATA power connector 18 and a SATA power cable 175, so as to provide a working current to be used by the external device 15.

Generally, the conventional SATA data connector 12 includes seven pins (S1 to S7): three GND pins and four data transmission pins, and the SATA power connector 18 includes fifteen connecting pins (P1 to P15).

The external power cable will not only form complexity of parts and increase the manufacturing cost, but also is not conductive to reducing the volume of power lines in the computer system and exporting working heat sources, and it is difficult to eliminate shortcomings of power line falling and improper system stop operation caused by high-frequency vibration use environments.

In addition, in order to pursue higher data transmission efficacy, the industry develops another SATA Express bus, and SATA Express includes a first connector and at least one second connector. The first connector is a four-pin connector including a Reserved pin, a PERST# pin, a CLKREQ#/DEVSLP pin, and an IFDet pin, and the second connector is a seven-pin connector including three GND pins and four data transmission pins.

Although the SATA Express connector is applicable to SATA transfer protocols or PCI Express (PCIe) transfer protocols to effectively increase the data transmission speed, it is still necessary for the SATA Express connector to connect to a power supply through a power connector and a power cable, which cannot alleviate the shortcomings formed by the external power.

SUMMARY

In view of the foregoing problems, a main objective of the present invention is to provide a SATA Express connector and further design the Reserved pin in the first connector to serve as a power supplying pin having power supplying effects, which not only can save the cost of the power lines, enable users to quickly install the product and provide plug and play effects, but also can effectively avoid shortcomings of power cable falling and system stop operation caused by severe high-frequency vibration environments, thereby enhancing stability of the overall system.

Therefore, in order to achieve the foregoing objective, the present invention provides a SATA Express connector, including a device-side connector, the device-side connector including: a first device-side connector provided with four first device-side pins, the first device-side pins including a power receiving pin, a PERST# pin, a CLKREQ#/DEVSLP pin and an IFDet pin; and one or more second device-side connectors, each of which is internally provided with at least seven second device-side pins.

Moreover, in order to achieve the foregoing objective, the present invention provides a SATA Express connector, including a device-side connector, the device-side connector including: a first device-side connector provided with four first device-side pins; and one or more second device-side connectors, each of which is internally provided with at least seven second device-side pins, where the seven second device-side pins of at least one of the second device-side connectors include a power receiving pin, two GND pins and four data transmission pins.

Further, in order to achieve the foregoing objective, the present invention provides a SATA Express connector, including a board-side connector, the board-side connector including: a first board-side connector provided with four first board-side pins, the first board-side pins including a power supplying pin, a PERST# pin, a CLKREQ#/DEVSLP pin and an IFDet pin; and one or more second board-side connectors, each of which is internally provided with at least seven second board-side pins.

Moreover, in order to achieve the foregoing objective, the present invention provides a SATA Express connector, including a board-side connector, the board-side connector including: a first board-side connector provided with four first board-side pins; and one or more second board-side connectors, each of which is internally provided with at least seven second board-side pins, where the seven second board-side pins of at least one of the second board-side connectors include a power supplying pin, two GND pins and four data transmission pins.

In another embodiment of the present invention, the first device-side connector is fixedly disposed on a side of one of the second device-side connectors.

In another embodiment of the present invention, the second device-side pins of the second device-side connector include three GND pins and four data transmission pins.

In another embodiment of the present invention, the second device-side pins of at least one of the second device-side connectors include a power receiving pin, two GND pins and four data transmission pins.

In another embodiment of the present invention, the device-side connector is fixedly provided with an external device, an application component, an application device or a transmission line.

In another embodiment of the present invention, the SATA Express connector is a SATA transfer protocol connector or a PCIe transfer protocol connector.

In another embodiment of the present invention, the SATA Express connector includes a board-side connector, the board-side connector including: a first board-side connector provided with four first board-side pins, the first board-side pins including a power supplying pin, a PERST# pin, a CLKREQ#/DEVSLP pin and an IFDet pin; and one or more second board-side connectors, each of which is internally provided with at least seven second board-side pins.

In another embodiment of the present invention, the first board-side connector is fixedly disposed on a side of one of the second board-side connectors.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 2:
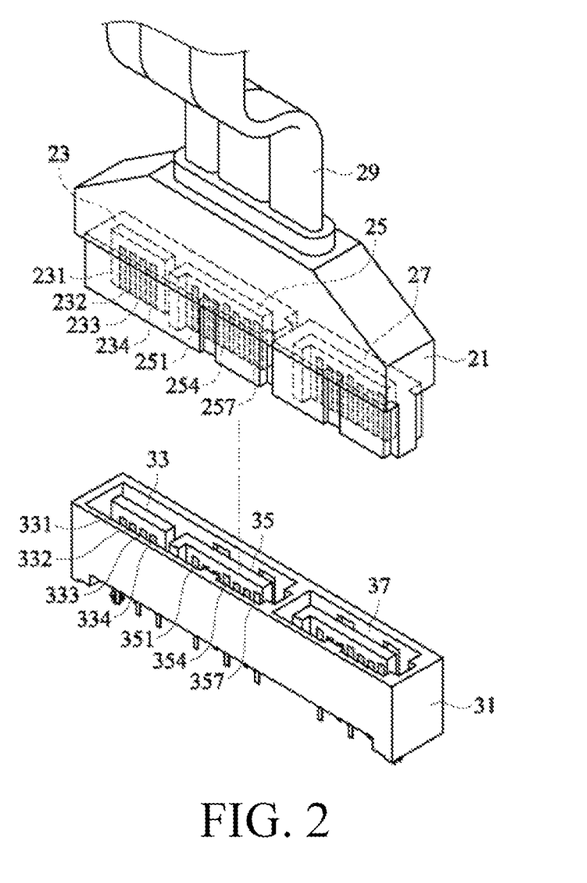
FIG. 2 is a schematic structural diagram of a preferred embodiment of a SATA Express connector according to the present invention.
Figure 3:
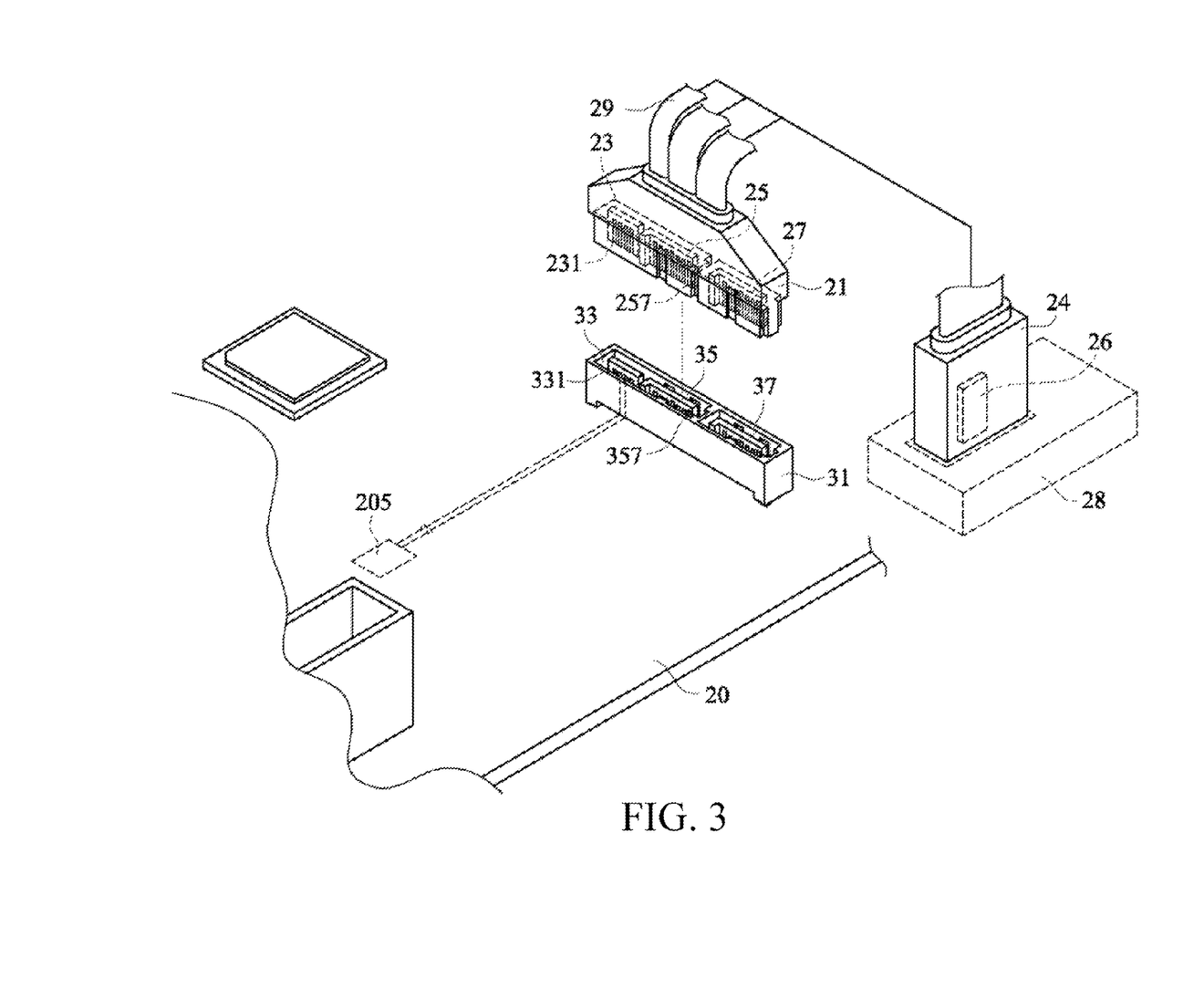
FIG. 3 is a schematic diagram of use of the SATA Express connector according to the present invention.

Embodiments of the present invention are described in detail below with reference to the accompanying drawings. First, referring to FIG. 2 and FIG. 3, FIG. 2 and FIG. 3 are respectively a schematic structural diagram and a schematic diagram of use of a preferred embodiment of a SATA Express connector according to the present invention. As shown in the figures, the SATA Express connector of the present invention may include a device-side connector 21 and a board-side connector 31, where the board-side connector 31 may be fixedly disposed on a computer system, a motherboard or a circuit board 20.

The device-side connector 21 includes a first device-side connector 23 and at least one second device-side connector, for example, there are two second device-side connectors 25 and 27 in this embodiment. The first device-side connector 23 has four first device-side pins: a first pin 231, a second pin 232, a third pin 233 and a fourth pin 234. The first pin 231 is a power receiving pin, the second pin 232 is a PERST# pin (preset pin), the third pin 233 is a CLKREQ#/DEVSLP pin (reference clock request/device sleep pin), and the fourth pin 234 is an IFDet pin (interface detect pin). The pin definition and effect of each pin of the four first device-side pins 231 to 234 may be arranged as above, but are not limited thereto.

Either of the second device-side connectors 25 and 27 of the device-side connector 21 is provided with at least seven second device-side pins, for example, seven second device-side pins shown in this embodiment, where a first pin (251; S1), a fourth pin (254; S4) and a seventh pin (257; S7) are GND pins (grounding pins), and other four pins (S2, and S3; and S5, and S6) are data transmission pins (A+/A−, and B+/B−; or Tx pair, and Rx pair).

In addition, the board-side connector 31 includes a first board-side connector 33 and at least one second board-side connector, for example, there are two second board-side connectors 35 and 37 in this embodiment. The first board-side connector 33 has four first board-side pins: a first pin 331, a second pin 332, a third pin 333 and a fourth pin 334. The first pin 331 is a power supplying pin, the second pin 332 is a PERST# pin, the third pin 333 is a CLKREQ#/DEVSLP pin, and the fourth pin 334 is an IFDet pin. The pin definition and effect of each pin of the four first board-side pins 331 to 334 may be arranged as above, but are not limited thereto.

Either of the second board-side connectors 35 and 37 of the board-side connector 31 is provided with at least seven second board-side pins, for example, seven second board-side pins shown in this embodiment, where a first pin (351; S1), a fourth pin (354; S4) and a seventh pin (357; S7) are GND pins, and other four pins (S2, and S3; and S5, and S6) are data transmission pins (A+/A−, and B+/B−; or Tx pair, and Rx pair).

The board-side connector 31 is fixedly disposed on a circuit board 20, and the power supplying pin 331 of the board-side connector 31 will connect to a circuit board power supplying line 205 on the circuit board 20. Therefore, when the device-side connector 21 is plugged into the board-side connector 31, the circuit board power supplying line 205, the power supplying pin 331 and the power receiving pin 231 will form a complete power supplying line, so as to supply a working power source of the device-side connector 21. Hence, in the present invention, not only can an installation procedure in which the device-side connector 21 is additionally provided with an external power cable be cancelled, but also the number of power cables used can be reduced, so as to help to eliminate high working temperatures in the computer system or the circuit board 20 and ensure use stability of the system.

When the device-side connector 21 is plugged into the board-side connector 31, the pins (for example, 251, 254, and 257) of the second device-side connectors 25 and 27 may also be correspondingly connected to the pins (for example, 351, 354, and 357) of the second board-side connectors 35 and 37, so as to achieve the purpose of data transmission.

In one embodiment of the present invention, the device-side connector 21 is fixedly disposed on one end of a transmission line 29, and the other end of the transmission line 29 can connect to an external device 24 and/or an application component 26 or 28. The power supplying line formed by the circuit board power supplying line 205, the power supplying pin 331 and the power receiving pin 231 can provide working power sources of the external device 24 and/or the application component 26 or 28, without additional use of an external power transmission cable.

The external device 24 and/or the application component 26 or 28 may be a memory, a storage device, a control device, a circuit board or an electronic application element.

Moreover, in another embodiment of the present invention, one or two of the first pin 251, the second pin 254 and the third pin 257 in the second device-side connector 25 and/or the other second device-side connector 27 of the device-side connector 21 can be selected to serve as a power receiving pin.

In other words, the four first device-side pins of the first device-side connector 23 of the device-side connector 21 are respectively: a Reserved pin, a PERST# pin, a CLKREQ#/DEVSLP pin and an IFDet pin. The seven second device-side pins of the second device-side connector 25 of the device-side connector 21 may be respectively: a power receiving pin, two data transmission pins (A+/A− or Tx pair), a GND pin, two data transmission pins (B+/B− or Rx pair) and a GND pin.

Similarly, one or two of the first pin 351, the second pin 354 and the third pin 357 in the second board-side connector 35 and/or the other second board-side connector 37 of the corresponding board-side connector 31 can be selected to serve as a power supplying pin.

The four first board-side pins of the first board-side connector 33 of the board-side connector 31 are respectively: a Reserved pin, a PERST# pin, a CLKREQ#/DEVSLP pin and an IFDet pin. The seven second board-side pins of the second board-side connector 35 of the board-side connector 31 may be respectively: a power supplying pin, two data transmission pins (A+/A− or Tx pair), a GND pin, two data transmission pins (B+/B− or Rx pair) and a GND pin.

In this embodiment, working power sources of the external device 24 and/or the application component 26 or 28 will be provided through the power supplying line formed by the circuit board power supplying line 205, the power supplying pin 351 and the power receiving pin 251, and similarly it is unnecessary to additionally use an external power transmission cable.

Moreover, the SATA Express connector of the present invention may detect through the IFDet pins 234 and 334 that the external device 24 and/or the application component 26 or 28 is a SATA transfer protocol device or a PCIe transfer protocol device, and thus it is concluded that the device-side connector 21 and the board-side connector 31 should be a SATA transfer protocol connector or a PCIe transfer protocol connector.

Figure 4:
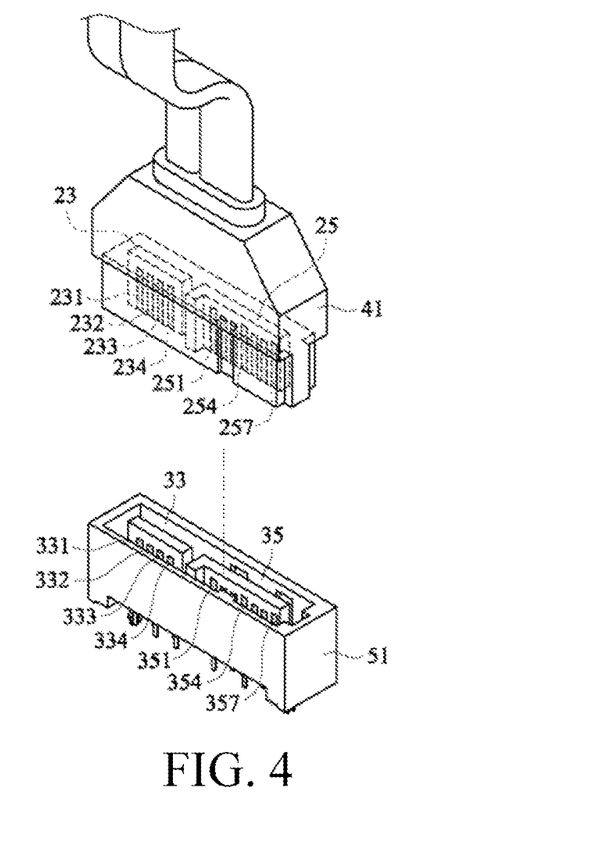
FIG. 4 is a schematic structural diagram of another embodiment of the SATA Express connector according to the present invention.

Moreover, referring to FIG. 4, FIG. 4 is a schematic structural diagram of another embodiment of the SATA Express connector according to the present invention. A device-side connector 41 includes a first device-side connector 23 and a second device-side connector 25. At least one of a first pin 231 of the first device-side connector 23 and first pins 251, 254 and 257 of the second device-side connector 25 is selected to serve as a power receiving pin.

Likewise, a board-side connector 51 may also include a first board-side connector 33 and a second board-side connector 35. At least one of a first pin 331 of the first board-side connector 33 and first pins 351, 354 and 357 of the second board-side connector 35 is selected to serve as a power supplying pin.

In the embodiment of the present invention, the first device-side connector 23 may be fixedly disposed on one side of the second device-side connector 25, and the first board-side connector 33 may also be fixedly disposed on one side of the second board-side connector 35. In different embodiments, the first device-side connector 23 is directly connected to the second device-side connector 25 to form an integral structure. The first board-side connector 33 is directly connected to the second board-side connector 35 to form an integral structure. Alternatively, the first board-side connector 33 is not directly connected to the second board-side connector 35, and a gap 55 exists between the two. Alternatively, the first device-side connector 23 is not directly connected to the second device-side connector 25, and a gap (not shown) exists between the two.

Figure 5:
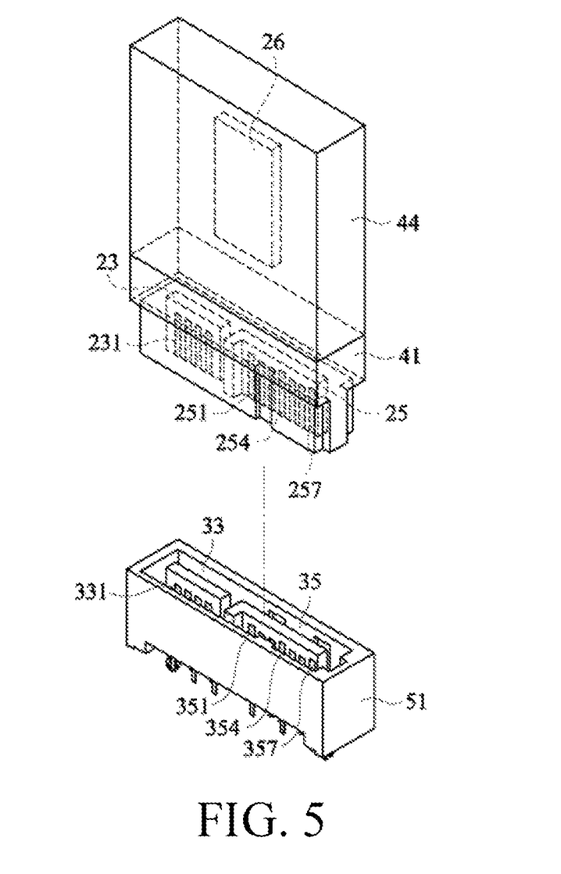
FIG. 5 is a schematic structural diagram of another embodiment of the SATA Express connector according to the present invention.

Next, referring to FIG. 5, FIG. 5 is a schematic structural diagram of another embodiment according to the present invention. As the application component 26 such as a circuit board, a control device or a memory tends to be designed to be light, thin, short and small, the application component 26 may also be directly fixedly disposed on the device-side connector 41, so as to become an application device 44 provided with the device-side connector 41. The device-side connector 41 of the application device 44 can be directly plugged into the board-side connector 51, while the application component 26 can operate within the application device 44, so that the transmission line 29 stated in the foregoing embodiment is not required.

For example, if the application component 26 is a memory, the application device 44 can become a memory device similar to a USB flash drive. Otherwise, if the application component 26 is a circuit board or a control device, the application device 44 can become a part applied to small computers, industrial computers or other small electronic devices.

Moreover, in another embodiment of the present invention, the pins of the device-side connector 41 and the board-side connector 51 may be selected to serve as a corresponding pin header, an edge connector pin 212 and a female pin header.

Figure 6:
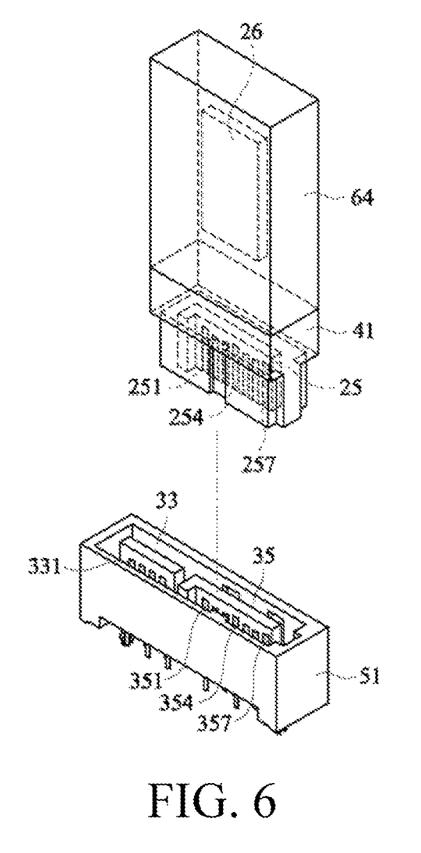
FIG. 6 is a schematic diagram of use of another embodiment of the SATA Express connector according to the present invention.

Finally, referring to FIG. 6, FIG. 6 is a schematic diagram of use of another embodiment of the SATA Express connector according to the present invention. A board-side connector 51 of the present invention may also be applicably plugged into a SATA application device 64, and performs data transmission with a SATA transfer protocol. A first pin 251, a fourth pin 254 or a seventh pin 257 in the SATA application device 64 is selected to serve as a power receiving pin, while a first pin 351, a fourth pin 354 or a seventh pin 357 in the second board-side pins of the board-side connector 51 may also serve as a power supplying pin at a corresponding pin position, so that the working power source of the SATA application device 64 can be provided through lapping of the power receiving pin and the power supplying pin without an external power cable.

The above descriptions are preferred embodiments of the present invention. The scope of the present invention is not limited to the embodiments. Equivalent modifications or variations made by persons skilled in the art according to the spirit of the present invention should be included in the claims.

What is claimed is:

1. A SATA Express connector, comprising a device-side connector, the device-side connector comprising:
   a first device-side connector provided with four pins, the pins of the first device-side connector comprising a power receiving pin, a sending reset signal pin (PERST pin), a providing reference clock pin (CLKREQ pin)/a triggering device sleeping mode pin (DEVSLP pin) and a Coz SATA-Expressing interface detecting pin (IFDet pin); and
   one or more second device-side connectors, each of which is internally provided with at least seven pins;
   wherein the pins of the second device-side connector comprise three GND pins and four data transmission pins.

2. The SATA Express connector according to claim 1, wherein the first device-side connector is fixedly connected to a side of one of the second device-side connectors.

3. The SATA Express connector according to claim 1, wherein the pins of at least one of the second device-side connectors comprise a power receiving pin, two GND pins and four data transmission pins.

4. The SATA Express connector according to claim 1, wherein the device-side connector is fixedly provided with an external device, an application component, an application device or a transmission line.

5. The SATA Express connector according to claim 1, comprising a board-side connector, the board-side connector comprising:
   a first board-side connector provided with four pins, the pins of the first board-side connector comprising a power supplying pin, a sending reset signal pin (PERST pin), a providing reference clock pin (CLKREQ pin)/a triggering device sleeping mode pin (DEVSLP pin) and a Coz SATA-Expressing interface detecting pin (IFDet pin); and
   one or more second board-side connectors, each of which is internally provided with at least seven pins.

6. A SATA Express connector, comprising a device-side connector, the device-side connector comprising:
   a first device-side connector provided with four pins comprising a sending reset signal pin (PERST pin) and a Coz SATA-Expressing interface detecting pin (IFDet pin); and
   one or more second device-side connectors, each of which is internally provided with at least seven pins, wherein the seven pins of at least one of the second device-side connectors comprise a power receiving pin, two GND pins and four data transmission pins.

7. The SATA Express connector according to claim 6, wherein the first device-side connector is fixedly connected to a side of one of the second device-side connectors.

8. The SATA Express connector according to claim 6, wherein the device-side connector is fixedly provided with an external device, an application component, an application device or a transmission line.

9. A SATA Express connector, comprising a board-side connector, the board-side connector comprising:
   a first board-side connector provided with four first board-side pins, the first board-side pins comprising a power receiving pin, a sending reset signal pin (PERST pin), a providing reference clock pin (CLKREQ pin)/a triggering device sleeping mode pin (DEVSLP pin) and a Coz SATA-Expressing interface detecting pin (IFDet pin); and
   one or more second board-side connectors, each of which is internally provided with at least seven second board-side pins;
   wherein the second board-side pins of the second board-side connector comprise three GND pins and four data transmission pins.

10. The SATA Express connector according to claim 9, wherein the first board-side connector is fixedly connected to a side of one of the second board-side connectors.

11. The SATA Express connector according to claim 9, wherein the second board-side pins of at least one of the second board-side connectors comprise a power supplying pin, two GND pins and four data transmission pins.

12. A SATA Express connector, comprising a board-side connector, the board-side connector comprising:
   a first board-side connector provided with four first board-side pins comprising a sending reset signal pin (PERST pin) and a Coz SATA-Expressing interface detecting pin (IFDet pin); and
   one or more second board-side connectors, each of which is internally provided with at least seven second board-side pins, wherein the seven second board-side pins of at least one of the second board-side connectors comprise a power supplying pin, two GND pins and four data transmission pins.

13. The SATA Express connector according to claim 12, wherein the first board-side connector is fixedly connected to a side of one of the second board-side connectors.

* * * * *